United States Patent
Lesueur

[11] 3,754,143
[45] Aug. 21, 1973

[54] MAGNETIC-OPTICAL GENERATOR

[75] Inventor: Gilbert Lesueur, Aix-les-Bains, France

[73] Assignee: Alsthom-Savoisienne, Saint-Ouen, France

[22] Filed: Sept. 23, 1971

[21] Appl. No.: 182,969

[30] Foreign Application Priority Data
Sept. 23, 1970 France .......................... 7034465

[52] U.S. Cl. ............ 250/204, 250/220, 250/225, 350/150
[51] Int. Cl. ............................ G01j 1/36
[58] Field of Search............. 250/225, 205, 204, 250/220 R, 217 R, 229, 227; 324/96; 350/150

[56] References Cited
UNITED STATES PATENTS

| | | |
|---|---|---|
| 3,659,111 | 4/1972 | Weaver et al. ................ 250/225 X |
| 3,173,983 | 3/1965 | Engle .............................. 250/205 |
| 2,796,530 | 6/1957 | Phillips et al. .................. 250/205 |
| 2,936,380 | 5/1960 | Anderson ....................... 250/225 |

*Primary Examiner*—Walter Stolwein
*Attorney*—Sughrue, Rothwell, Mion, Zinn & Macpeak

[57] ABSTRACT

Magnetic-optical generator, transmitting light impulses along several channels, characterized by the fact that a portion of the flow transmitted in each channel is sent on to a photo-electric detector whose electric output signal is compared to a reference in order to give a signal which is in sequence switched by a control logic to the control of a magnetic field producing coil in each one of the channels taken in succession.

1 Claim, 1 Drawing Figure

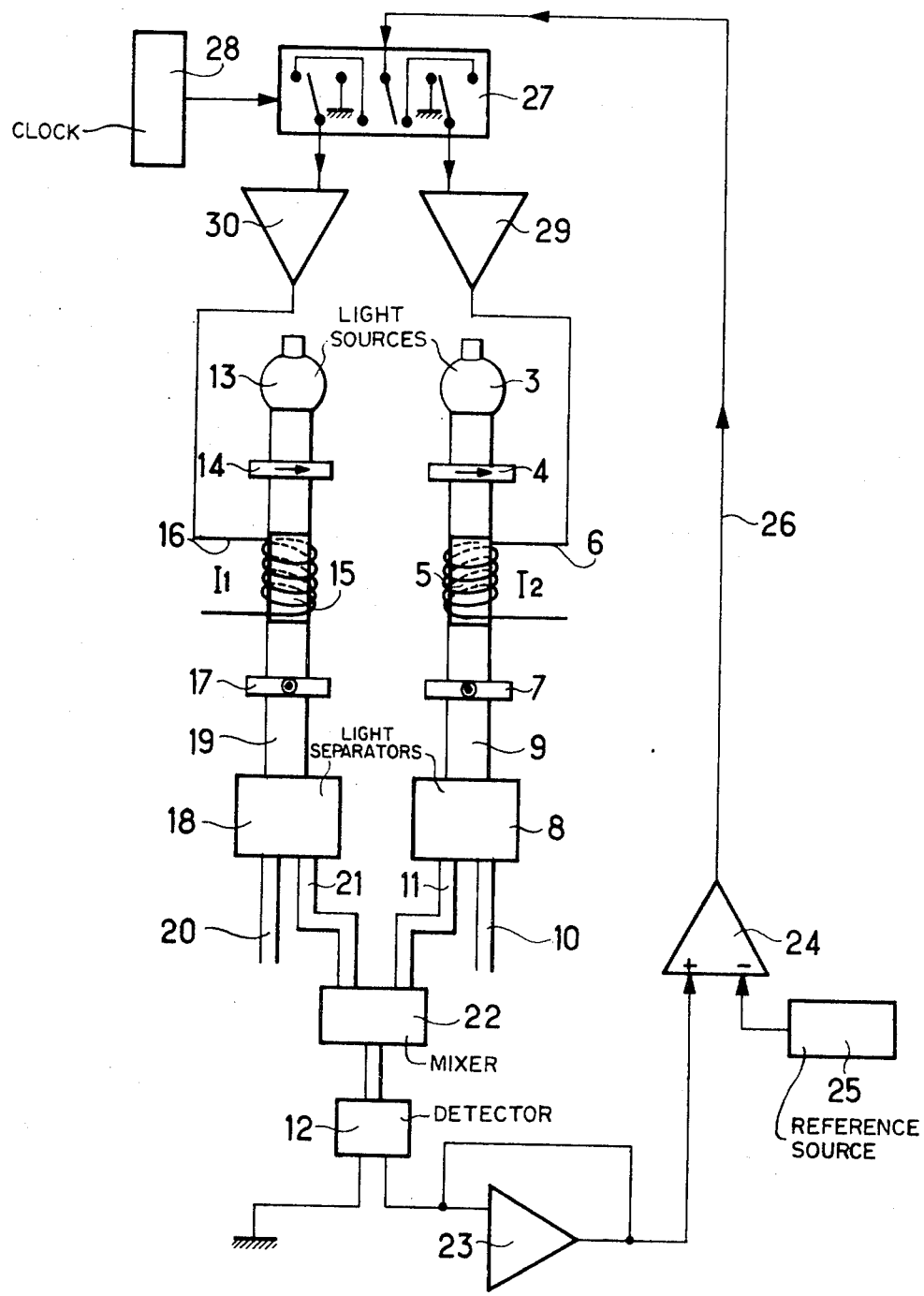

MAGNETIC-OPTICAL GENERATOR

In the field of measurement reduction units with optical connection, one has often compared the intensity of two light waves and since one cannot directly obtain the difference between these two magnitudes, one must set up two photo-electric detectors and perform a subtraction among electrical magnitudes. The inconvenience is that the photo-electric detectors are subject to drift and that the measurements thus made involve the risk of being distorted due to the different variation of the characteristics of the two photodetectors.

It would thus be worthwhile to be able to use a single photoelectric detector which would, in a sequential fashion, receive one and then the other of the light waves to be compared. To do this, however, requires a generator transmitting, in a sequential fashion—at least in two directions—identical light impulses or at least impulses whose amplitudes are connected to each other, at a given repetition frequency.

The purpose of this invention is to provide a magnetic-optical generator which transmits light impulses along several channels. This makes it possible to meet the requirements listed above for measurement reducers and which can also meet other conditions and which can thus be used in numerous ways, especially in the field of data transmission.

The magnetic-optical generator of the invention, in each of the channels in which it transmits, includes an optical chain consisting of at least:

A light source, a polarizer, a material with magnetic rotating power subjected to the electrical field of a coil, and an analyzer, crossed with the polarizer, at whose output a light flow is available for use, and is characterized by the fact that a determined portion of the light flow, coming out of each analyzer, is picked up and sent on to a single photo-electric detector, followed by a comparator which also receives an electrical reference magnitude and furnishes a comparison signal between the former and the signal coming out of the photo-electric detector, a comparison signal which is used to control the supply to the coils, and a control logic which sequentially shunts the comparison signal to the power supply of the coil of one of said channels taken in succession and simultaneously blocking the power supply of the coil of the other channel or the other channels.

Thus, the members arranged between the light flow, picked up in each one of the channels, and the comparator are the same, regardless of the channel concerned, and their possible drift thus does not affect the equality or the relationship between the amplitudes of the light waves transmitted in the various channels.

The electrical reference magnitude may be the same for each one of the channels or it may be made up of different data, each one of which must be transmitted on a different channel.

Referring now to the attached diagram, we will describe an example, given here without any limitations, with regard to implementing a magnetic-optical generator in accordance with the invention, transmitting light impulses along two channels.

The two channels have been designated, overall, by 1 and 2. Channel 1 includes a light source 3, a polarizer 4, a material 5 with magnetic rotating core, such as flint, with an electrical coil 6, an analyzer 7 crossed with polarizer 4, and a light fiber separator 8 which receives a bundle of fibers 9 and from which issue two fiber bundles 10 and 11;

Bundle 10, connected to the utilization end not shown here, and bundle 11, which for example, may be a fifth as large as the bundle 10 and which is connected to a power supply comparison and control device for coil 6, whose input is a photo-electric detector 12. Likewise, channel 2 includes a light source 13, a polarizer 14, a material 15 with magnetic rotation power, with a coil 16, an analyzer 17 crossed with the polarizer 14, and a light fiber separator 18 which receives a bundle of fibers 19 and from which issue a bundle 20, connected to the utilization end, and a bundle 21, connected to detector 12. The detector 12, for example, is a photodiode, a phototransistor, a photo-voltaic cell or a photoresistant cell. Between bundles 11 and 21 and detector 12 is inserted a mixer 22.

In the example shown, we have assumed that we want to obtain identical light impulses on the two channels 1 and 2, and the proportion between the light flow picked up at 11 or 21 and the flow going to the utilization end at 10 or 20 is rigorously the same for both of the two channels.

The electrical signal transmitted by detector 12 is amplified in an amplifier 23 and compared in an amplifier-comparator 24 to a reference signal 25. A signal, which is a function of the difference between these two signals, is transmitted by comparator 24 via line 26 into a control logic 27, controlled by a clock 28. Control logic 27, composed of transistors, alternately establishes communication between the signal transmitted at 26 and the control input of one or the other of the two power amplifiers 29 and 30, which respectively, supply coil 6 and coil 16. At the same time, the control logic 27 cancels out the power supply current of that one of the two coils whose supply amplifier does not receive the signal transmitted via line 26. The operations that can be performed by the control logic have been illustrated by means of switches.

Thus, while the control logic 27 cancels out the amplifier 30 of the power supply of the coil 16—which cancels out the light flow in channel 2, since, in the absence of current in coil 16, there is no light flow at 19 to the output of the analyzer 17 which is crossed with the polarizer 14—it communicates the signal transmitted at 26 to the amplifier 29. This signal produces a current $I_2$ in the coil 6 which, at 11, gives off a light flow sufficient to cancel the electrical signal transmitted at 26. In the following sequence, controlled by clock 28, the power supply amplifier 29 of coil 6 is blocked and current $I_2$ is brought back down to 0, which cancels out the light flow in the channel 1. Simultaneously, the control logic switches the signal transmitted at 26 to the amplifier 30, which creates a current $I_1$ in coil 16 and a light flow at 21, sufficient to cancel out the electrical signal transmitted at 26. In the following sequence, it is once again channel 1 which transmits a light flow, and so forth and so on.

The amplifiers 29 and 30 could be replaced by a single amplifier placed upstream from the control logic 27, but this would result in a complication of the latter since it would have to switch power currents and not just simple control currents.

In this way we get series of identical light impulses on each of the channels 1 and 2, and a drift in the members 12, 23, or 24 does not bring about any relative modification of the light flows transmitted by these two channels, whereas a drift in the other members, on the other hand, has no influence on the light flows obtained.

What is claimed is:

1. A magnetic-optical generator transmitting light impulses along several channels comprising: in each of the channels in which it transmits, a chain made up of at least: a light source, a poliarizer, a material with magnetic rotating power, a coil for generating an electrical field, said field influencing said material, and an analyzer crossed with the polarizer, at the output of which a light flow is available for utilization, and means for dividing the light flow from said analyzer; a determined portion of the light flow coming out of each analyzer being supplied to a single photo-electric detector, common to all said channels, a comparator receiving the output of said detector and receiving an electrical reference magnitude and furnishing a comparison signal said comparison signal being used to control the power supply of the coils, and a control logic which, in sequence, shunts the comparison signal to the power supply of the coil of one of said channels, taken in succession, and simultaneously blocking the power supply to the coils of the other channels.

* * * * *